(12) United States Patent
Schwarz

(10) Patent No.: US 12,183,135 B2
(45) Date of Patent: Dec. 31, 2024

(54) DIAGNOSTIC SYSTEM FOR MOTOR VEHICLES

(71) Applicant: Bayerische Motoren Werke Aktiengesellschaft, Munich (DE)

(72) Inventor: Johannes Schwarz, Wolfsegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 252 days.

(21) Appl. No.: 17/795,142

(22) PCT Filed: Feb. 12, 2021

(86) PCT No.: PCT/EP2021/053394
§ 371 (c)(1),
(2) Date: Jul. 25, 2022

(87) PCT Pub. No.: WO2021/180415
PCT Pub. Date: Sep. 16, 2021

(65) Prior Publication Data
US 2023/0057443 A1 Feb. 23, 2023

(30) Foreign Application Priority Data
Mar. 11, 2020 (DE) .......................... 102020106545.0

(51) Int. Cl.
*G06F 11/07* (2006.01)
*G06Q 30/016* (2023.01)
(Continued)

(52) U.S. Cl.
CPC ........... *G07C 5/085* (2013.01); *G06Q 30/016* (2013.01); *G07C 5/008* (2013.01)

(58) Field of Classification Search
CPC ........... G06F 11/07; G06F 15/00; G07C 5/08; G05B 19/048
See application file for complete search history.

(56) References Cited

U.S. PATENT DOCUMENTS

2005/0192722 A1  9/2005  Noguchi
2007/0226540 A1  9/2007  Konieczny
(Continued)

FOREIGN PATENT DOCUMENTS

DE            101 07 367 A1     9/2002
DE   10 2010 051 133 A1     6/2011
EP             0 629 774 A1   12/1994

OTHER PUBLICATIONS

International Search Report (PCT/ISA/210) issued in PCT Application No. PCT/EP2021/053394 dated May 10, 2021 with English translation (five (5) pages).
(Continued)

*Primary Examiner* — Tan Q Nguyen
(74) *Attorney, Agent, or Firm* — Crowell & Moring LLP

(57) ABSTRACT

An electronic control unit for a motor vehicle diagnostic system includes a diagnostic module for identifying and storing faults; a decision module, by way of which specific fault reactions are assigned to each identifiable fault and specific customer complaint states are assigned to the fault reactions; and a generation module for generating a defined fault status. For each fault which is set in the fault memory and can be transmitted to a diagnostic tester external to the vehicle by way of a fault log, the fault status can be generated such that all customer complaint states assigned to the fault can be identified from the fault log in the diagnostic tester. The decision module is also provided to a suitable diagnostic tester having a transmission interface to the at least one electronic control unit.

5 Claims, 3 Drawing Sheets

(51) Int. Cl.
  *G07C 5/00*    (2006.01)
  *G07C 5/08*    (2006.01)

(56) References Cited

U.S. PATENT DOCUMENTS

| | | | |
|---|---|---|---|
| 2009/0306849 A1* | 12/2009 | Blanz | G05B 23/0264 |
| | | | 701/31.4 |
| 2011/0118932 A1 | 5/2011 | Singh et al. | |
| 2011/0137711 A1 | 6/2011 | Singh et al. | |
| 2013/0124032 A1* | 5/2013 | Singh | G05B 23/0278 |
| | | | 701/29.4 |
| 2017/0039785 A1* | 2/2017 | Richter | G07C 5/008 |
| 2017/0132578 A1 | 5/2017 | Merg et al. | |
| 2018/0164760 A1* | 6/2018 | Felke | G05B 23/02 |
| 2018/0357614 A1* | 12/2018 | Merg | G06Q 50/40 |

OTHER PUBLICATIONS

German-language Written Opinion (PCT/ISA/237) issued in PCT Application No. PCT/EP2021/053394 dated May 10, 2021 (three (3) pages).

German-language Search Report issued in German Application No. 10 2020 106 545.0 dated Feb. 1, 2021 with partial English translation (12 pages).

* cited by examiner

DIAGNOSTIC SYSTEM FOR MOTOR VEHICLES

BACKGROUND AND SUMMARY OF THE INVENTION

The invention relates to a diagnostic system for diagnosing faults in motor vehicles. Such diagnostic systems are discussed in EP 0 629 774 B1, for example.

Diagnostic systems and diagnostic methods for motor vehicles having control units inside the vehicle which are capable of self-diagnosis and are intended to check electronically controlled systems have already been known for many years, wherein fault memories provided in the control units are queried using a diagnostic unit (also called "tester") which is outside the vehicle and can be connected to a motor vehicle. Test steps to be performed may also be specified using a tester or diagnostic unit.

Control units inside the vehicle which are capable of self-diagnosis generally check their input and output signals in this case (on-board diagnosis). On the basis of the checked data, if a fault is identified, fault information is stored in a non-volatile memory which can be read in a workshop using the tester.

Possible fault information is, for example, the absence of a particular sensor signal. However, this fault may be attributed to a plurality of possible causes: for example interruption at any point in the cable harness or as a result of a connector which has not been completely closed or as a result of a defective input circuit associated with this sensor signal in the control unit.

Test steps specified on the basis of fault information are used to find the exact cause of the fault. Since, in practice, the components which are possible for a particular fault, in particular the electronic control units, are often replaced on spec despite carrying out the test steps, unnecessarily high repair costs arise. Components which are intact, however, are also sent for repair.

The object of the invention is to ensure even more targeted fault diagnosis for motor vehicles, in particular in the workshop.

This object is achieved by the features of the claimed invention.

The invention relates to at least one electronic control unit and/or a diagnostic tester for a motor vehicle diagnostic system.

The electronic control unit according to an embodiment of the invention for a motor vehicle is equipped with a diagnostic module for identifying and storing faults, with a decision module which is used to assign specific fault reactions to each identifiable fault and to assign specific customer complaint states to the fault reactions, and with a generation module for generating a defined fault status.

The fault status can be generated for each fault, which has been set in the fault memory and can be transmitted to a diagnostic tester outside the vehicle using a fault log, in such a manner that all customer complaint states assigned to the fault can be identified from the fault log in the diagnostic tester.

A matching diagnostic tester having a transmission interface to the at least one electronic control unit is likewise provided with the decision module. The decision module may be in the form of a programmed table structure, for example, and may either be likewise stored in the diagnostic tester and in the control unit or may be transmitted from the control unit to the diagnostic tester. The diagnostic tester contains an evaluation unit which can be used to identify the assigned customer complaint states from the defined fault status of a fault or of a plurality of faults that has been transmitted by the control unit using the decision module.

The number of specific customer complaint states is preferably (substantially) less than the number of specific fault reactions.

The invention is based on the following findings:

The tester outside the vehicle contains evaluation apparatuses, for example, which are used to analyze and display the information which can be gathered from the fault memory for the purpose of accurately locating faults. A fault memory indicates, for example, a fault number, the type of fault and operating parameters which are present when the fault occurs. The type of fault may be, for example, a short circuit to ground, a short circuit to the positive terminal or an interruption.

The fault number indicates, for example, which component or which electrical path is faulty. However, such a fault number is only functional fault information which, although narrowing down the fault location, cannot accurately indicate the cause of the fault.

The invention was developed with the conception of a new emergency operation manager. More accurate so-called "pinpointing" (=reference to the cause of a fault) must be enabled with the new emergency operation manager concept.

According to the prior art, the workshop can read the fault memories if a customer with a complaint enters the workshop (for example "My vehicle no longer accelerates correctly", "The engine automatic start/stop system no longer functions"). However, the fault memories do not contain any more detailed information relating to the effect of the faults on the vehicle and its behavior. Therefore, in the case of a plurality of fault memory entries, there is no information in the workshop relating to what fault memory processing should be started with regard to the complaint. Documents which are sometimes complicated must be consulted in order to check which of the faults was able to result in the customer complaint.

The invention is based on the fact that fault memory entries (fault:="FS_y") are linked to different fault reactions (fault reaction:="FR_x") inside the control unit. These links are implemented as a first table structure and are called transverse locks here. The transverse locks of all faults are stipulated in a so-called transverse locking matrix ("QVM"). The transverse locking matrix may differ from vehicle to vehicle. However, the current transverse locking matrix is always stored in the control units which are capable of self-diagnosis (for example engine control unit, transmission control unit, brake control unit, etc.). An embodiment of the invention provides a second table structure, according to which defined customer perception states, which also correspond to the effects of the fault reactions which can be sensed by the customer, are assigned to the different fault reactions in the sense of complexity-reducing block formation. Furthermore, according to an embodiment of the invention, these two table structures are made directly available as additional information in the workshop for reading from the control units by way of the diagnostic unit (tester). The invention makes it possible for the workshop to directly access the two relevant table structures and to therefore process the customer complaint in the form of a defined customer perception state ("FZD_i"), for example FZD_1="My vehicle no longer accelerates correctly" or FZD_2="The engine automatic start/stop system no longer functions", more quickly since it is directly clear to the workshop which fault (FS_y) has resulted in a specific customer complaint (FZD_i). The information is transmitted via the known tester interface or by way of another fault memory environment outside the vehicle. The two table structures mentioned above are referred to in summary below as a decision module.

The invention is explained in more detail on the basis of an exemplary embodiment.

DETAILED DESCRIPTION OF THE DRAWINGS

Figure 1:
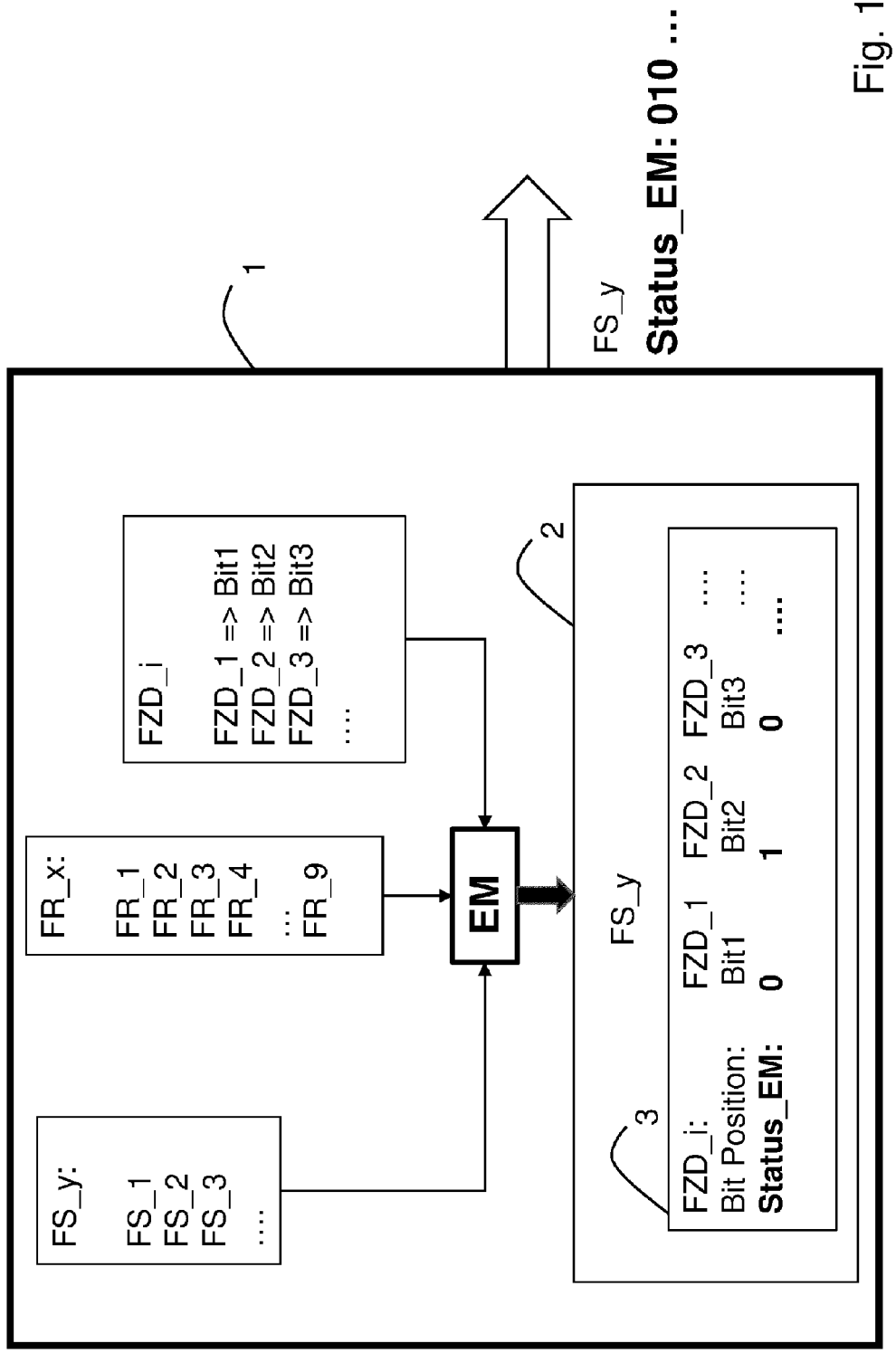
FIG. 1 shows the most important components according to an embodiment of the invention in an electronic control unit.

FIG. 1 shows the most important components according to the invention in an electronic control unit 1 having a diagnostic module 2 for identifying and storing faults FS_y and having a decision module EM.

Figure 2:
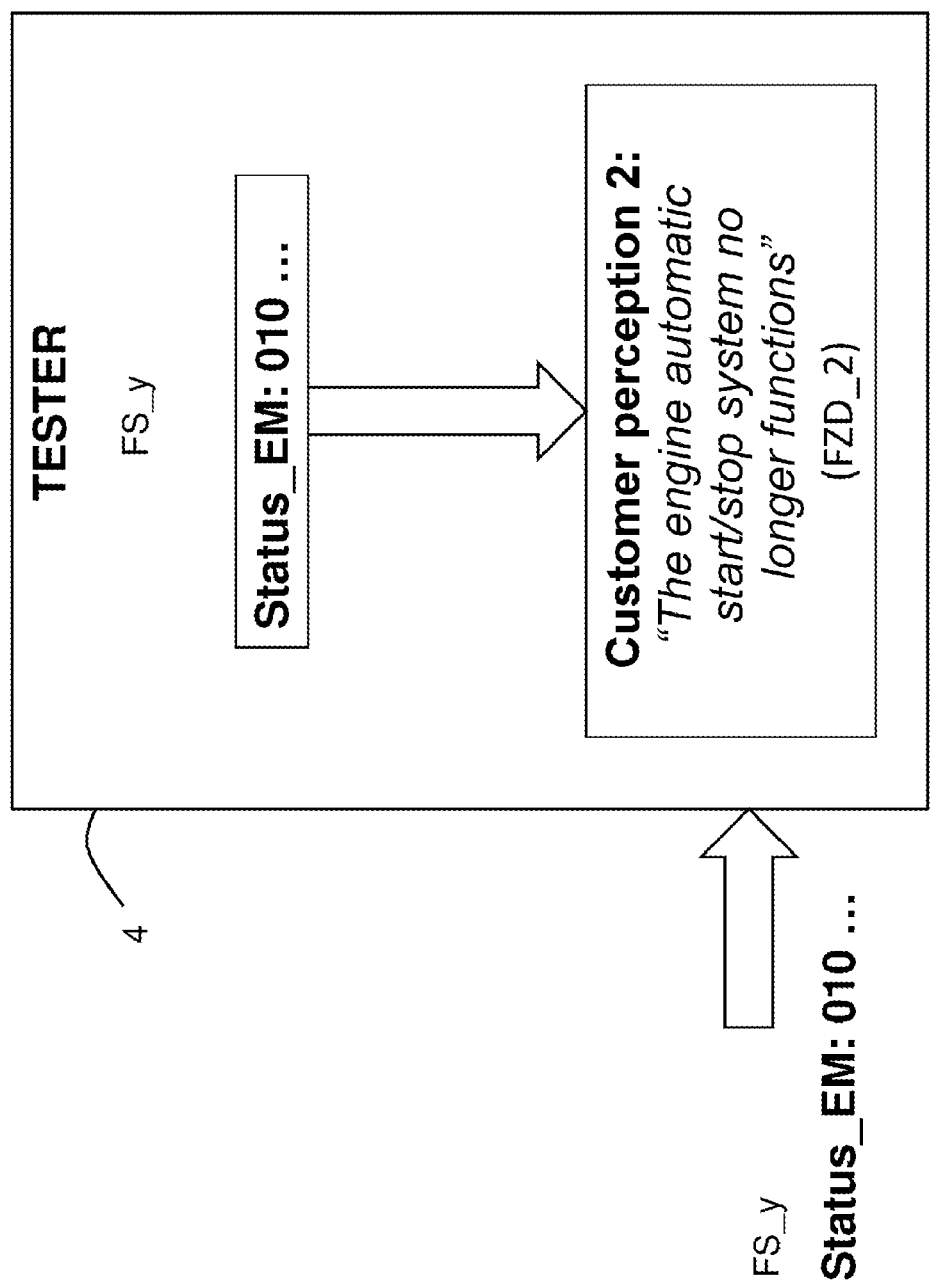
FIG. 2 shows the most important components according to an embodiment of the invention in a tester.

As a result of the appropriate configuration of the control unit 1, in particular with regard to the diagnostic module 2 and the decision module EM, fault reactions (FR_x; with index x=1, 2, 4, . . . ) determined by development are assigned, according to an embodiment of the invention, to defined faults (FS_y; with index y=1, 2, 4, . . . ), on the one hand, and to the known customer complaints in the form of defined customer perception states (FZD_i; with index i=1, 2, 4, . . . ), on the other hand. These assignments by way of the decision module EM are made available both in the control unit 1 and in the tester 4 (FIG. 2). The control unit 1 may transmit these assignments for storage in the tester 4 each time the tester is connected.

In the control unit 1, a check is preferably carried out in order to determine whether a specific fault FS_y triggers one or more of the previously determined fault reactions FR_x which in turn result in a defined customer perception state FZD_i. If this is the case, the fault memory status "Status_EM" defined according to an embodiment of the invention is output to the tester 4 in the workshop.

This new fault memory status "Status_EM" is preferably a binary code with a predefined number of bits, wherein each bit position is assigned to a possible customer perception state (FZD_i).

FIG. 2 schematically illustrates a diagnostic tester 4 which can be connected to the control unit 1. The diagnostic tester 4 is in turn preferably configured in such a manner that it is aware of the bit assignment of the fault memory status "Status_EM" which identifies the customer perception state FZD_i using a bit ("1") which has been set at a particular bit position.

Figure 3:
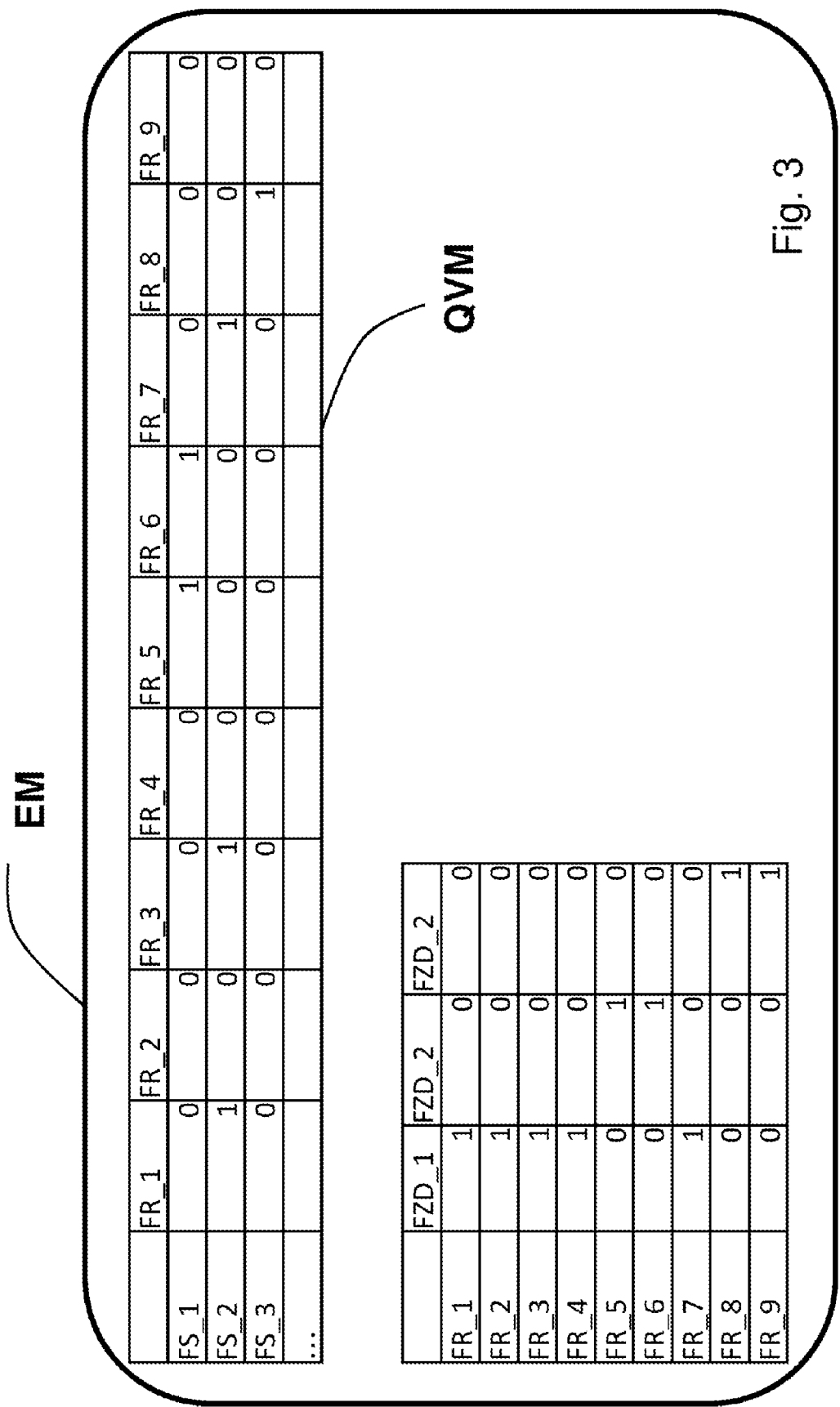
FIG. 3 shows an example of a decision module according to an embodiment of the invention on the basis of a first and a second table structure.

FIG. 3 shows an example of a possible decision module EM, that is to say an overall table structure, which is used to assign specific fault reactions FR_x to faults FS_y (via the transverse locking matrix) and to assign specific customer complaint states FZD_i to the fault reactions FR_x. Block formation ("clustering") for iteratively locating faults more quickly takes place by way of the customer complaint states FZD_i, the number of which is less than the number of fault reactions FR_x.

Development stipulates beforehand, for example, that the fault reaction FR_1 results in comparatively little torque limitation, FR_2 results in comparatively high torque limitation, FR_3 results in comparatively little speed limitation and FR_4 results in comparatively high speed limitation. These FR_y all correspond to the customer perception "My vehicle no longer accelerates correctly" or the customer perception state FZD_1.

FR_5 results in a forced engine start, for example, and FR_6 results in prevention of an engine stop. These FR_y correspond to the customer perception "The engine automatic start/stop system no longer functions" or the customer perception state FZD_2.

For example, FZD_2 is assigned to the bit position Bit1 and FZD_2 is assigned to the bit position Bit2 of the fault memory status "Status_EM". Bit1 is therefore assigned to the customer perception state FZD_1 "My vehicle no longer accelerates correctly" and Bit2 is assigned to the customer perception state FZD_2 "The engine automatic start/stop system no longer functions".

If, for example, a fault FS_y with the fault reaction FR_6 were to occur and be set in the fault memory of the control unit 1, the statement by the customer in the workshop would be: "The engine automatic start/stop system no longer functions".

The workshop now reads the fault memory as standard using the tester 4 and can check according to an embodiment of the invention whether Bit2 has been set ("1") in the fault memory status "Status_EM". Since this is the case in the example, the processing of the fault rectification measure can be specifically started here by first of all dealing with all faults FS_y which have been set and result in the customer perception state FZD_2.

Therefore, starting from the more general customer perception, the transverse locking matrix QVM or the decision module EM can be used to work back to the details of the fault reactions FR_x and finally the cause of the fault.

The invention claimed is:

1. An electronic control unit for a motor vehicle, the electronic control unit comprising:
   a diagnostic module for identifying and storing faults,
   a decision module comprising a first table structure which is used to assign fault reactions to each identifiable fault and a second table structure which is used to assign customer complaint states to the fault reactions, and
   a generation module for generating a defined fault status which is generatable for each fault, which has been set in a fault memory and is transmittable to a diagnostic tester outside the vehicle using a fault log, such that all customer complaint states assigned to the fault are identifiable from the fault log in the diagnostic tester.

2. A diagnostic tester comprising:
   a transmission interface to the electronic control unit according to claim 1, and
   an evaluation unit which is configured to identify assigned customer complaint states from a defined fault status of a fault that has been transmitted by the electronic control unit.

3. A diagnostic system comprising the electronic control unit according to claim 1, wherein a number of customer complaint states is less than a number of fault reactions.

4. The diagnostic system according to claim 3, further comprising:
   a transmission interface to the electronic control unit, and
   an evaluation unit which is configured to identify assigned customer complaint states from a defined fault status of a fault that has been transmitted by the electronic control unit.

5. A fault memory status for the electronic control unit according to claim 1, wherein:
  the fault memory status is generated as binary code with a predefined number of bits, and
  each bit position is assigned to a possible customer perception state.

* * * * *